United States Patent
Chapman et al.

(10) Patent No.: US 8,778,551 B2
(45) Date of Patent: Jul. 15, 2014

(54) FLUID FLOW PULSING FOR INCREASED STABILITY IN PEM FUEL CELL

(75) Inventors: Ivan Daryl Chapman, Victor, NY (US); Charles Mackintosh, Victor, NY (US); Pinkhas A. Rapaport, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1033 days.

(21) Appl. No.: 12/021,394

(22) Filed: Jan. 29, 2008

(65) Prior Publication Data

US 2008/0118793 A1 May 22, 2008

Related U.S. Application Data

(63) Continuation of application No. 10/851,396, filed on May 21, 2004, now abandoned.

(51) Int. Cl.
*H01M 8/04* (2006.01)
*H01M 2/38* (2006.01)
*H01M 2/40* (2006.01)
*H01M 8/24* (2006.01)

(52) U.S. Cl.
USPC ........... 429/446; 426/430; 426/432; 426/442; 426/444; 426/456

(58) Field of Classification Search
USPC .................. 429/430, 432, 442, 444, 446, 456
See application file for complete search history.

(56) References Cited

U.S. PATENT DOCUMENTS

| | | | |
|---|---|---|---|
| 6,093,502 A | 7/2000 | Carlstrom, Jr. et al. | |
| 6,103,409 A * | 8/2000 | DiPierno Bosco et al. | 429/13 |
| 6,322,914 B1 | 11/2001 | Chow et al. | |
| 6,376,111 B1 | 4/2002 | Mathias et al. | |
| 6,406,806 B1 | 6/2002 | Keskula et al. | |
| 6,455,180 B1 | 9/2002 | Mowery et al. | |
| 6,497,970 B1 | 12/2002 | Fronk | |
| 6,576,359 B2 | 6/2003 | Fronk | |
| 6,692,851 B2 | 2/2004 | Keskula et al. | |
| 2001/0016276 A1* | 8/2001 | Yamanashi | 429/22 |
| 2002/0045080 A1* | 4/2002 | Andou et al. | 429/20 |
| 2003/0022041 A1 | 1/2003 | Barton et al. | |
| 2003/0022042 A1* | 1/2003 | Wells et al. | 429/23 |

FOREIGN PATENT DOCUMENTS

JP 2001015140 1/2001
WO WO 02/081367 A2 * 10/2002

* cited by examiner

*Primary Examiner* — Eugenia Wang
(74) *Attorney, Agent, or Firm* — Quinn Law Group, PLLC

(57) ABSTRACT

A fuel cell system includes a fuel cell stack and a flow control device that controls a supply of a first phase fluid flowing through the fuel cell stack. A controller monitors at least one parameter of the fuel cell stack and controls the supply to generate pulses of reactant when the at least one parameter crosses a threshold to flush a second phase fluid from said fuel cell stack.

19 Claims, 4 Drawing Sheets

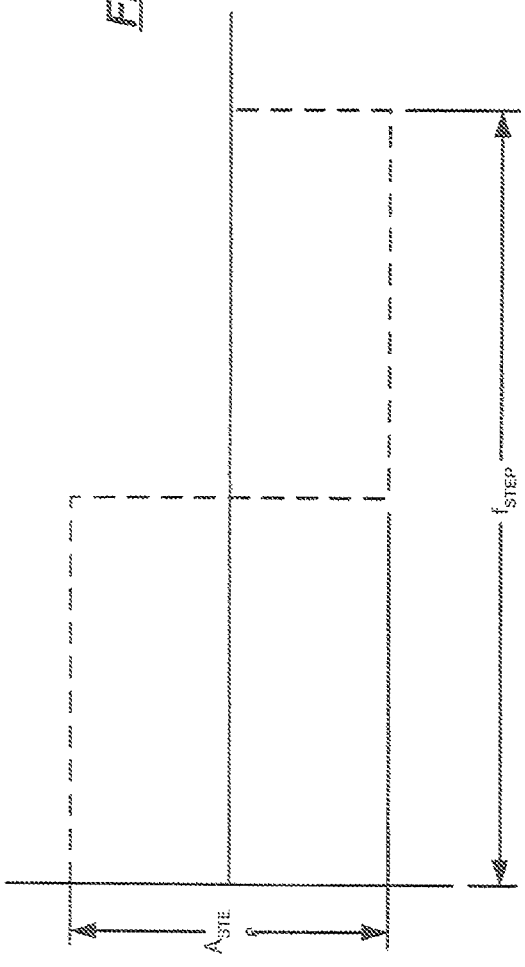
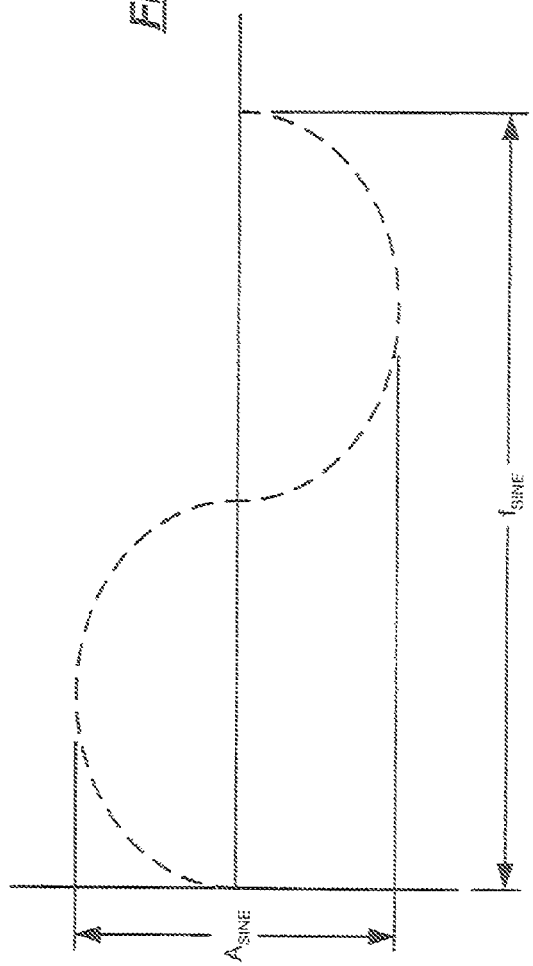

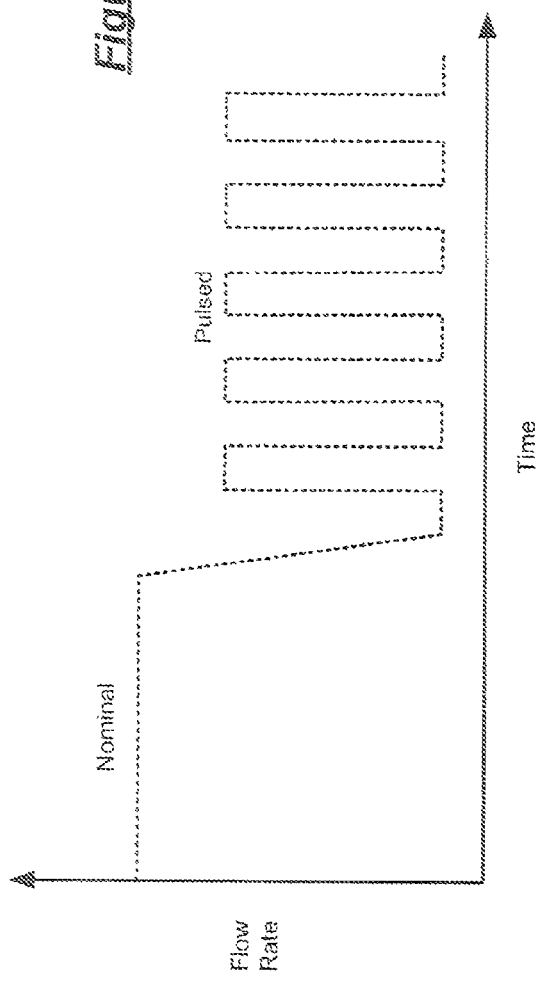
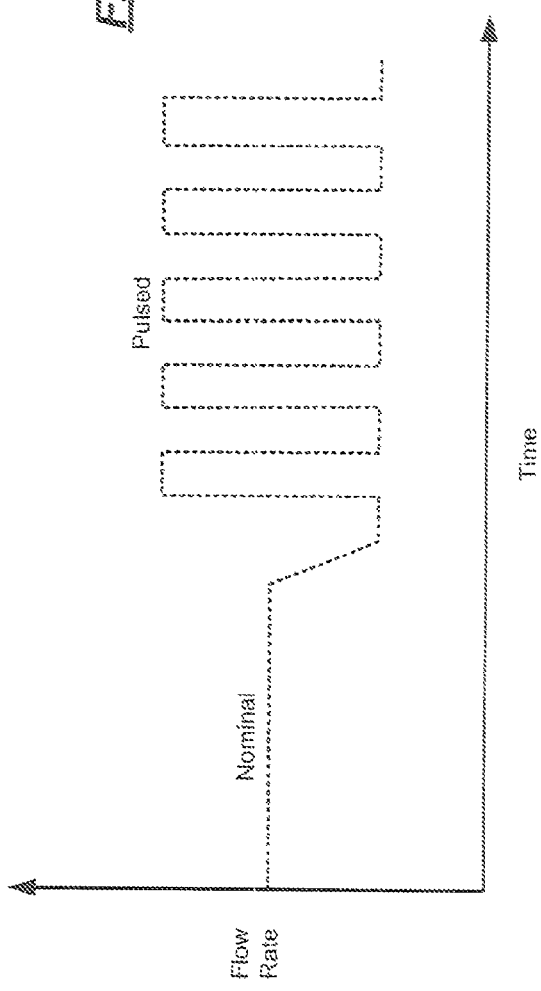

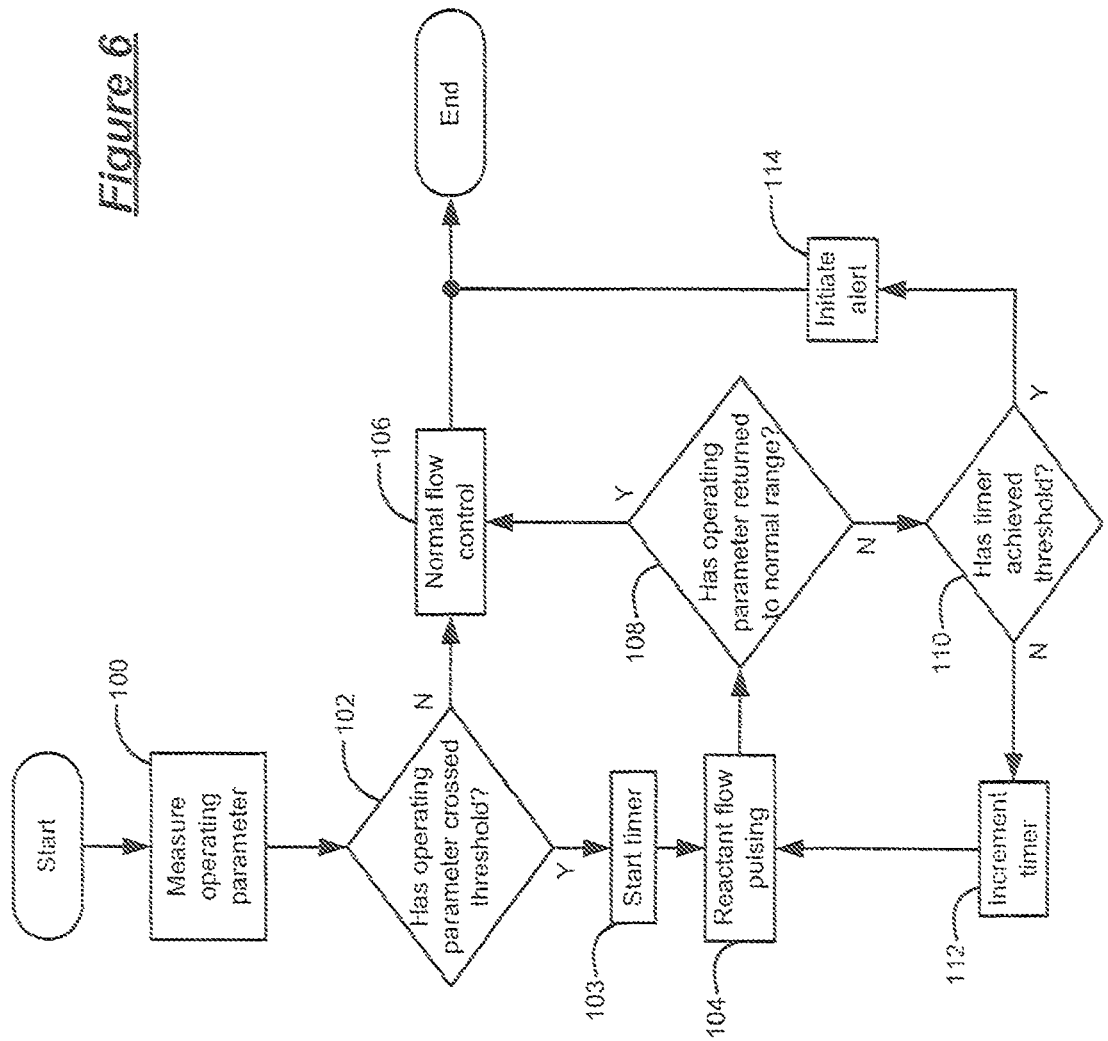

FLUID FLOW PULSING FOR INCREASED STABILITY IN PEM FUEL CELL

CROSS-REFERENCE TO RELATED APPLICATIONS

This application is a continuation Application of U.S. patent application Ser. No. 10/851,396 filed on May 21, 2004, now abandoned.

FIELD OF THE INVENTION

The present invention relates to fuel cells, and more particularly to regulating reactant and coolant flows to increase stability of a fuel cell.

BACKGROUND OF THE INVENTION

Fuel cells produce electricity through electrochemical reaction and have been used as power sources in many applications. Fuel cells can offer significant benefits over other sources of electrical energy, such as improved efficiency, reliability, durability, cost and environmental benefits. Fuel cells may, eventually be used in automobiles and trucks. Fuel cells may also power homes and businesses.

There are several different types of fuel cells, each having advantages that may make them particularly suited to given applications. One type is a proton exchange membrane (PEM) fuel cell, which has a membrane sandwiched between an anode and a cathode. The membrane and respective electrodes together in an assembly are referred to as a membrane electrode assembly (MEA). To produce electricity through an electrochemical reaction, hydrogen ($H_2$) or hydrogen containing gas is supplied to the anode side half-cell via an anode flow field and air or oxygen ($O_2$) is supplied to the cathode side half-cell via a cathode flow field.

In a first half-cell reaction, dissociation of the hydrogen ($H_2$) at the anode generates hydrogen protons ($H^+$) and electrons ($e^-$). Because the membrane is proton conductive, the protons are transported through the membrane. The electrons flow through an electrical load that is connected across the electrodes. In a second half-cell reaction, oxygen ($O_2$) at the cathode reacts with protons ($H^+$) and electrons ($e^-$) are taken up to form water ($H_2O$). Parasitic heat is generated by the reactions and must be regulated to provide efficient operation of the fuel cell stack.

Fuel cell stacks include reactant flow fields and coolant flow fields. The reactant flow fields distribute anode and cathode reactant fluids across the individual cells of the fuel cell stack. The coolant flow fields distribute a heat transfer (coolant) fluid to regulate the operating temperature of the fuel cell stack. In the case of the reactant flow fields, the anode and cathode reactant fluids are distributed as gas phase fluids. In the case of the coolant flow fields, the heat transfer fluid is distributed as a liquid phase fluid.

Under certain operating conditions, a liquid phase fluid can form in the reactant flow fields. The liquid phase fluid impedes flow of the gas phase reactant fluids, which can result in unstable operation of the fuel cell stack. Such a situation typically occurs when consistently operating the fuel cell stack at a low load level. Traditionally, the stability issues are mitigated by applying higher anode and/or cathode stoichiometry to avoid unstable operation. This presents a significant disadvantage, however, in that a high percentage of the reactant is wasted. As a result, system efficiency is decreased.

Gas and/or vapor phase fluids can also form in the coolant flow fields. The gas phase fluid impedes flow of the liquid phase heat transfer fluid, which can result in localized temperature increases or hot spots within the fuel cell stack. These hot spots, reduce the durability of the fuel cell stack and can result in localized damage to the fuel cell stack. The presence of such hot spots in the stack or in a particular cell can be identified by some increase in temperature and/or in cell resistance, which leads to some decrease in cell voltage.

SUMMARY OF THE INVENTION

Accordingly, the present invention provides a fuel cell system including a fuel cell stack and a flow control device that controls a supply of a first phase fluid flowing through the fuel cell stack. A controller monitors at least one parameter of the fuel cell stack and controls the supply to generate pulses of reactant when the at least one parameter crosses a threshold value to flush a second phase fluid from said fuel cell stack.

In other features, the pulses are defined by at least one pulse feature selected from a pulse duration, interval between pulses, a pulse shape, as determined by the controller. The at least one pulse feature is based on an extent by which the at least one parameter varies from the threshold value.

In other features, the fuel cell system further includes at least one voltage sensor that senses a voltage of a respective individual cell of the fuel cell stack and provides a signal to the controller. The parameter includes a cell voltage and the threshold is a minimum cell voltage threshold. Alternatively, the threshold includes an average voltage fluctuation defined by at least one of a magnitude and a frequency of individual cell voltage fluctuations.

In other features, the fuel cell system further includes a voltage sensor that monitors a stack voltage and provides a signal to the controller based on the parameter, which is the stack voltage. The threshold includes a minimum stack voltage. Alternatively, the threshold includes an average voltage fluctuation defined by at least one of a magnitude and a frequency of stack voltage fluctuations.

In other features, the fuel cell system further includes a pressure sensing system that senses a fluid pressure drop across the fuel cell stack and provides a signal to the controller based on the parameter, which is the pressure drop. The threshold includes a maximum pressure drop. Alternatively, the threshold includes an average pressure drop fluctuation defined by at least one of a magnitude and a frequency of stack pressure drop fluctuations.

In another feature, the parameter is a resistance of at least one fuel cell.

In other features, the fuel cell system further includes a temperature sensing system that senses a fluid temperature increase across the fuel cell stack and provides a signal to the controller based on the parameter, which is the temperature increase. The threshold includes a maximum temperature increase. Alternatively, the threshold includes an average temperature increase fluctuation defined by at least one of a magnitude and a frequency of stack temperature increase fluctuations.

In still another feature, the parameter is stack load and the threshold value is a minimum stack load.

In yet another feature, the flow control device is at least one flow regulator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a graph illustrating an exemplary pulse-wave according to the present invention;

FIG. 3 is a graph illustrating an alternative exemplary pulse-wave according to the present invention;

FIG. 4 is a graph illustrating a flow pulsing strategy;

FIG. 5 is a graph illustrating an alternative flow pulsing strategy; and

FIG. 6 is a flowchart illustrating the reactant and/or coolant flow control according to the present invention.

DETAILED DESCRIPTION OF THE PREFERRED EMBODIMENTS

Figure 1:
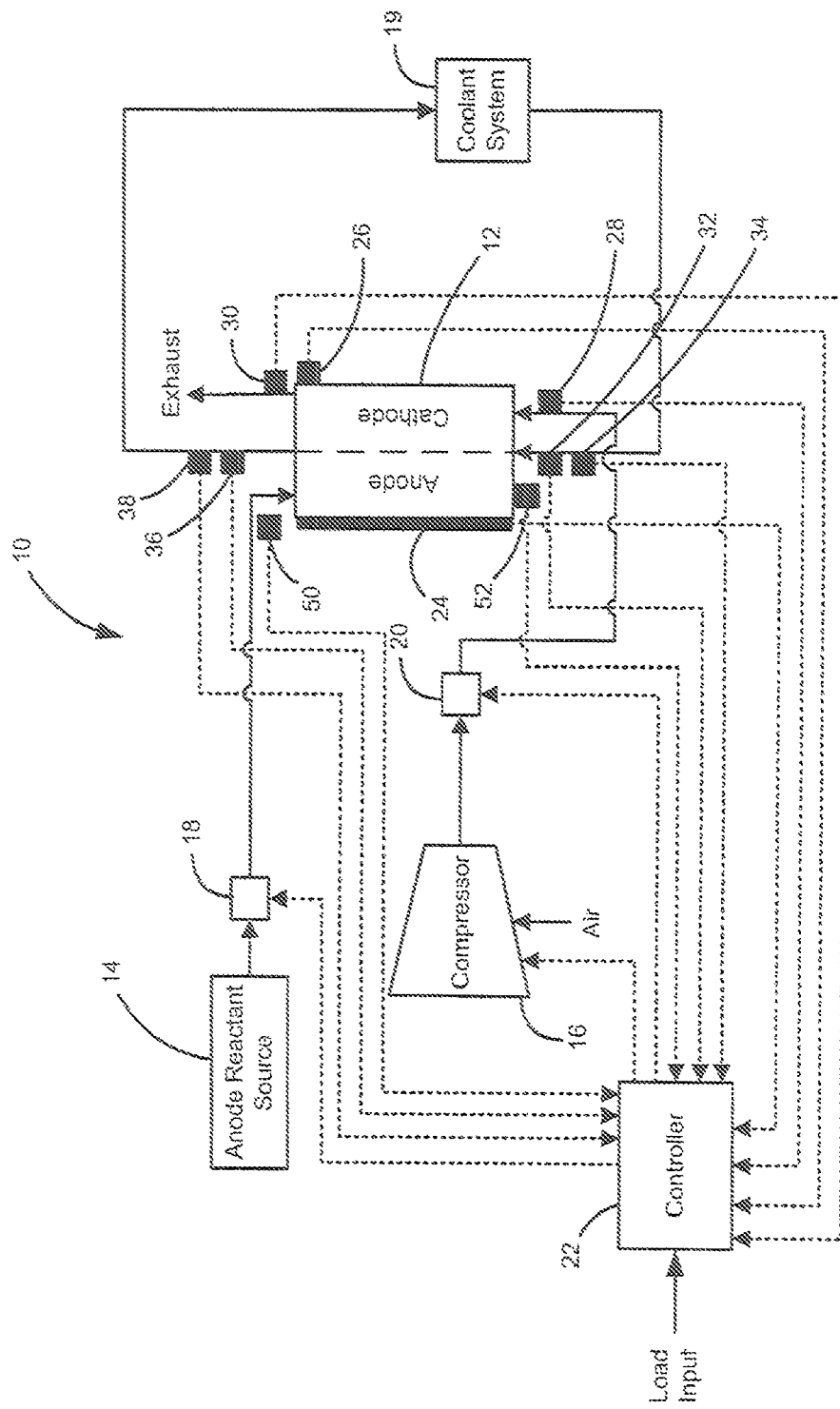
FIG. 1 is a schematic illustration of a fuel cell system according to the present invention.

The following description of the preferred embodiments is merely exemplary in nature and is in no way intended to limit the invention, its application, or uses.

Referring now to FIG. 1, an exemplary fuel cell system 10 is illustrated. The fuel cell system 10 includes a fuel cell stack 12 that process reactants to generate electricity. More specifically, the fuel cell stack 12 includes an anode side through which an anode reactant flows and a cathode side through which a cathode reactant flows. The anode reactant is supplied by an anode reactant source 14 and generally includes hydrogen or a hydrogen-rich reformate. The cathode reactant is generally provided as oxygen-rich air supplied by a compressor 16. An anode control device (FCD) 18, such as a regulator, regulates anode reactant flow to the fuel cell stack 12. A cathode FCD 20, such as a regulator, regulates cathode reactant flow to the fuel cell stack 12. The anode and cathode reactant fluids flow through the fuel cell stack 12 in gas phase form.

The fuel cell system 10 further includes a coolant system 19 that circulates a heat transfer fluid through the fuel cell stack 12. Although not illustrated, the coolant system 19 generally includes a pump, a reservoir and a heat exchanger. The heat transfer fluid flows through the fuel cell stack 12 in liquid phase form to regulate the operating temperature of the fuel cell stack 12. The heat transfer fluid can be used to cool the fuel cell stack 12 or heat the fuel cell stack 12 as environmental operating conditions so require. The coolant flow is controlled by regulating the speed (RPM) of the pump.

A controller 22 regulates operation of the fuel cell stack 12 and coolant system 19. The controller 22 is in communication with the anode and cathode FCD's 18,20, compressor 16 and the coolant system 19. More specifically, the controller 22 generates control signals to regulate operation of the fuel cell system components based on a desired load input. The desired load input indicates a desired power output for the fuel cell system. For example, in the case of a vehicle, the desired load input is generated by a throttle.

A cell sensor system 24 monitors cell voltages of individual fuel cells or groups of individual fuel cells in the fuel cell stack 12. The cell sensor system 24 generates cell voltage signals that are received by the controller 22. The cell sensor system 24 can include multiple cell voltage sensors (not shown) or a single voltage sensor (not shown) that is electrically switched to measure the voltage of individual cells. A voltage sensor 26 monitors the total voltage of the fuel cell stack 12. The voltage sensor 26 generates a stack voltage signal that is received by the controller 22. Inlet and outlet pressure sensors 28,30, respectively, are provided on the cathode side of the fuel cell stack 12. Similar pressure sensors 50, 52 are applied to the respective inlet and outlet of the anode side of the fuel cell stack 12. The inlet pressure sensor 28 generates an inlet pressure signal and the outlet pressure sensor 30 generates an outlet pressure signal. The inlet and outlet pressure signals are received by the controller 22. All other pressure sensors as well as the temperature sensors act in a similar way, and their output signals can be received by controller 22. The resistance of individual cells, groups of individual cells and/or the total fuel cell stack resistance can be measured by applying a high frequency resistance (HFR) measurement technique. The HFR measurement technique for individual fuel cells is described in detail in commonly assigned U.S. Pat. No. 6,376,111, issued on Apr. 23, 2002, the disclosure of which is expressly incorporated herein by reference. The HFR measurement technique for groups of fuel cells is described in detail in commonly assigned U.S. Pat. No. 6,406,806, issued on Jun. 18, 2002, the disclosure of which is expressly incorporated herein by reference. The pressure differential between the anode and cathode sides of the MEA is monitored and controlled so as to not exceed a value suitable for the membrane, MEA and the stack assembly encompassing the membrane.

Inlet temperature and pressure sensors 32,34, respectively, are provided at the heat transfer fluid inlet to the fuel cell stack 12. The inlet temperature sensor 32 generates an inlet temperature ($T_{IN}$) signal and the inlet pressure sensor 34 generates an inlet pressure ($P_{IN}$) signal. Outlet temperature and pressure sensors 36,38, respectively, are provided at the heat transfer fluid outlet of the fuel cell stack 12. The outlet temperature sensor 36 generates an outlet temperature ($T_{OUT}$) signal and the outlet pressure sensor 38 generates an outlet pressure ($P_{OUT}$) signal.

The fuel cell control of the present invention regulates reactant flow through the fuel cell stack 12 based on a monitored operating parameter. More specifically, the fuel cell control generates reactant flow pulses to purge the reactant flow channels of the fuel cell stack 12 of any potential obstructions including liquid phase fluids. For example, under particular operating conditions, precipitate accumulates within the reactant flow channels. This accumulation can lead to the formation of precipitate slugs that flow through the reactant flow channels. This results in inefficient fuel cell operation and possible damage to the fuel cell stack 12. As used herein, a precipitate designates accumulation of a substance, such as condensed water forming the slugs, which impede reactant flow. Unstable stack operation results from the accumulation of precipitate within the reactant flow channels. More particularly, a thin precipitate film forms on the reactant flow channel walls. The precipitate slugs interrupt stable operation of the fuel cell stack.

The operating parameters include, but are not limited to, load on the fuel cell stack 12, individual cell voltage, individual cell resistance, pressure drop across a reactant side, stack voltage fluctuation and pressure drop fluctuation across a reactant side, pressure and temperature change and fluctuation across the coolant side of the fuel cell stack. When the particular operating parameter crosses a corresponding threshold, the fuel cell control generates reactant or coolant flow pulses. Although the reactant flow pulses can be generated in either reactant side, the cathode side is more susceptible to precipitate accumulation. Generation of the reactant flow pulses is controlled to inhibit significant pressure differentials across the polymer electrolyte membrane (PEM) (i.e., between the anode and cathode sides). It is anticipated that the controller 22 monitors the above-identified operating parameters either alone or in combination. That is to say, the controller 22 can monitor a single operating parameter, multiple operating parameters or all of the operating parameters to trigger reactant or coolant flow pulsing.

A pressure differential between the anode side and the cathode side is monitored. More specifically, the reactant flow pulsing is regulated to maintain the pressure differential below a threshold value. The threshold value is determined based on the particular fuel cell stack design. For example, the threshold may be higher for a more robust fuel cell stack than for a less robust fuel cell stack. If the pressure differential is too great, damage to the fuel cells of the fuel cell stack 12 can occur. Therefore, if the pressure differential exceeds the threshold value, the reactant flow pulsing can cease or be limited to reduce the pressure differential below the threshold.

With particular reference to FIGS. 2 and 3, the reactant flow pulses are generated to have a particular waveform based on the conditions instigating reactant flow pulsing. As illustrated in FIG. 2, an exemplary waveform includes a step-wave having an amplitude ($A_{STEP}$) and a frequency ($f_{STEP}$). As illustrated in FIG. 3, an alternative exemplary waveform includes a sine-wave having an amplitude ($A_{SINE}$) and a frequency ($f_{SINE}$). It is appreciated that the waveforms illustrated herein are exemplary in nature and other waveforms, such as saw-tooth and ramp formed can be used in the method of the present invention. The duration of the reactant pulse can vary. For example, it is anticipated that the duration is for a preset period. Upon expiration of the period, the reactant flow pulsing ceases. It is also anticipated that the reactant flow pulsing continues until the condition that precipitated the reactant flow pulsing is improved or resolved completely.

Referring now to FIGS. 4 and 5, a pulse differentiates from a typical nominal continuous flow rate conventionally used to supply reactants without rapid modulation. The pulses of the present invention may occur under any of a variety of conditions, such as: termination of a nominal flow rate and initiation of a pulsed flow at a pressure and/or flow rate greater than or less than that of the nominal rate (see FIG. 4), continued propagation of the nominal rate with intermittently added reactant to cause a pressure and/or flow pulse (see FIG. 5) and other variations consistent with the present invention. Although the nominal flow rate may itself be considered a pulse of an extended duration and at a relatively constant value, the present invention differentiates from this and is directed to a more rapid modulation of flow via pulses and the pulse features as described herein. Such pulse features are selected from pulse duration, interval between pulses (i.e., frequency) and pulse shape. Preferably, flow pulsing occurs while varying at least one of the pulse features. The invention also contemplates the continuing of a nominal flow rate while a pulse is imposed on such flow (for example, by means of intermittent operation of an injector).

With particular regard to fuel cell stack load, precipitate in the flow-field channels is more likely to form during periods of low load. At low load, less cathode and anode reactants flow through the fuel cell stack 12. As a result, precipitate within the fuel cell stack 12 is less likely to be flushed by the reactant flow. Therefore, the fuel cell control implements reactant flow pulsing to flush potential precipitate during operation at low load. In one example, the controller 22 monitors the load of the fuel cell stack 12. If the load falls below a load threshold, the fuel cell control initiates reactant flow pulsing. The reactant flow pulsing continues until the load is above the load threshold. In another example, the reactant flow pulsing is inversely proportional to load (i.e., the intensity of reactant flow pulsing decreases as load increases and increases as load decreases). In this example, however, it is preferred that there is no reactant flow pulsing at higher load levels.

In the case of minimal cell voltage, the voltages of the individual fuel cells in the fuel cell stack 12 are monitored, and these voltages are compared to a cell voltage threshold. If the lowest of the cell voltages falls below a cell voltage threshold, the fuel cell control initiates reactant flow pulsing. In one example, the cell voltage threshold is a preset minimum cell voltage. In another example, the cell voltage threshold is the difference between the average cell voltage and a preset tolerance (e.g., 200 mV). For example, if the average cell voltage is 800 mV and the present tolerance is 200 mV, the fuel cell control implements reactant flow pulsing if the lowest of the cell voltages falls below 600 mV.

Referring now to individual cell resistance, the resistances of the individual fuel cells in the fuel cell stack 12 are monitored and these resistances are compared to a cell resistance threshold. If the lowest cell resistance falls below a cell resistance threshold, the fuel cell control initiates reactant flow pulsing. In one example, the cell resistance threshold is a preset minimum cell voltage. In another example, the cell resistance threshold is the difference between the average cell resistance and a preset tolerance (e.g., 0.04 Ohm*$cm^2$). For example, if the average cell resistance is 0.11 Ohm*$cm^2$ and the present tolerance is 0.04 Ohm*$cm^2$, the fuel cell control implements reactant flow pulsing if the lowest cell resistance falls below 0.07 Ohm*$cm^2$ or exceeds 0.150 Ohm*$cm^2$.

In the case of pressure drop across a reactant side, the fuel cell control triggers reactant flow pulsing if the pressure difference between the inlet and outlet of the particular reactant side (e.g., cathode side) exceeds a pressure drop threshold (e.g., 25 kPa). For example, in the case of the cathode side, the pressure at the cathode side inlet is detected by the inlet pressure sensor 28, and the pressure at the cathode side outlet is detected by the outlet pressure sensor 30. The controller 22 calculates the pressure drop as the difference between the pressure sensor signals and compares the pressure drop to the preset threshold. The reactant side pressure drop operating parameter is an average fuel cell stack characteristic. Therefore, monitoring of the individual fuel cells of the fuel cell stack 12 is not required.

With regard to average stack voltage fluctuation, the fuel cell control monitors the fuel cell stack voltage using the voltage sensor. The fuel cell stack voltage is the total voltage of all of the fuel cells in the fuel cell stack 12. More particularly, the magnitude and frequency of the stack voltage fluctuations are monitored. If the average magnitude and/or average frequency of fuel cell stack voltage fluctuations exceed respective thresholds, reactant flow pulsing is triggered. The fuel cell stack voltage fluctuation operating parameter is an average fuel cell stack characteristic. Therefore, monitoring of the individual fuel cells of the fuel cell stack 12 is not required.

Referring now to reactant side pressure drop fluctuation, the fuel cell control monitors the pressure drop fluctuations using the inlet and outlet pressure sensors 28,30. More particularly, the magnitude and frequency of the pressure drop fluctuations are monitored. If the average magnitude and/or average frequency of pressure drop fluctuations exceed respective thresholds, reactant flow pulsing is triggered. The pressure drop fluctuation operating parameter is an average fuel cell stack characteristic. Therefore, monitoring of the individual fuel cells of the fuel cell stack 12 is not required.

Referring now to FIG. 6, the fuel cell control of the present invention will be described in further detail. In step 100 control measures a particular operating parameter. The operating parameter can include, but is not limited to, load on the fuel cell stack 12, individual cell voltage, individual cell resistance, pressure drop across a reactant side, average stack voltage fluctuation and pressure drop fluctuation across a reactant side. Control determines whether the operating parameter has crossed its corresponding threshold in step 102. If the operating parameter has crossed its corresponding threshold, control continues in step 103. If the operating parameter has not crossed its corresponding threshold, control continues in step 106.

Control initiates a timer in step 103. In step 104, control implements reactant flow pulsing. Control determines whether the operating parameter has returned to its normal operating range (i.e., crossed back over its corresponding threshold) in step 108. If the operating parameter has returned to its normal operating range, control implements normal flow control in step 106 and control ends. If the operating parameter has not returned to its normal operating range, control continues in step 110.

In step 110, control determines whether the timer has achieved a timer threshold. If the timer has not achieved the timer threshold, control increments the timer in step 112 and loops back to step 104. If the timer has achieved the timer threshold, control initiates an alert in step 114 and control ends. The alert informs an operator that the fuel cell system 10 is performing at an undesirable level and can include a visual alert and/or an audible alert. The alert can also include information regarding the monitored operating parameter. It is further anticipated that the alert can include a fuel cell system shut down action to prevent damage to the fuel cell stack 12. In this manner, the fuel cell control attempts to correct an undesirable operating condition using reactant flow pulsing. If the condition does not subside after the threshold time period has expired, the fuel cell control alerts an operator and/or terminates fuel cell system operation to prevent damage to the fuel cell stack 12.

It is also anticipated that an additional timing loop can be implemented to monitor the operating parameter for a threshold period after returning to the normal range. In this manner, the fuel cell control ensures that the operating parameter stays within the normal range before ceasing reactant flow pulsing.

Although the foregoing discussion describes implementation of the flow pulsing for the reactant flow fields, it is also anticipated that flow pulsing can be implemented for the coolant flow fields. More particularly, a gas phase fluid (e.g., steam bubbles) can form in the coolant flow field and impede flow of the liquid phase heat transfer fluid. Coolant flow pulsing dislodges and flushes the gas phase fluid from the coolant flow field to prevent localized heating across the fuel cell stack.

The heat transfer fluid flow pulsing is regulated based on a temperature differential ($\Delta T$) and/or a pressure differential ($\Delta P$) of the heat transfer fluid across the fuel cell stack 12. $\Delta T$ is determined as the difference between $T_{IN}$ and $T_{OUT}$ and $\Delta P$ is determined as the difference between $P_{IN}$ and $P_{OUT}$. $\Delta T$ is compared to a threshold temperature differential. If $\Delta T$ is greater than the threshold temperature differential, the heat transfer fluid flow is pulsed as similarly described above for the reactant fluids. $\Delta P$ is compared to a threshold pressure differential. If $\Delta P$ is greater than the threshold pressure differential, the heat transfer fluid flow is pulsed. The pulse flow concepts of the present invention were tested as compared to a comparative conventional stack flow at low load. In a conventional stack run at low load, the cathode stoichiometry is increased from 1.6 to about 1.8 increasing compressor power by about 12% in order to achieve stable operation. In contrast, running at low load and pulsing with about 50% flow increase, for up to about a minute, at up to about 10 minute intervals resulted in stable operation while increasing compressor power only about 2 to 3%. Furthermore, the voltage drop in the comparative case was dramatic, dropping from 0.8V to 0.3V or less in 1 to 2 hours. In the pulsed case, the voltage drop was maintained at about 0.8V for 10 hours or more. The same results applied to coolant pulsing, where periodic pulsing virtually eliminated gas bubbles and hot spots while pump power increased only about 6%.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
    a fuel cell stack comprising:
        at least one membrane electrode assembly including a cathode and an anode;
        a cathode pressure sensor; and
        an anode pressure sensor;
    a flow control device that controls a supply of a reactant gas flowing through said fuel cell stack, wherein said flow control device is a flow regulator;
    a compressor separate from the flow control device that provides said supply of a reactant gas; and
    a controller that monitors at least one parameter of said fuel cell stack and controls said supply to terminate a nominal flow rate and generate pulses of said reactant gas of a particular waveform when each time said at least one parameter crosses a threshold to flush said fuel cell stack, said controller limiting said pulses based on a pressure differential between said cathode pressure sensor and said anode pressure sensor so as to not exceed a pressure differential value suitable for said membrane electrode assembly.

2. The fuel cell system of claim 1 wherein said controller is operable to vary said pulses using at least one pulse feature selected from pulse duration, interval between pulses and amplitude.

3. The fuel cell system of claim 2 wherein at least one of said particular waveform and said at least one pulse feature is based on an extent by which said at least one parameter varies from said threshold.

4. The fuel cell system of claim 1 further comprising at least one voltage sensor sensing voltage of a respective cell of said fuel cell stack and provides a signal to said controller.

5. The fuel cell system of claim 4 wherein said parameter includes a cell voltage and said threshold is a minimum cell voltage threshold.

6. The fuel cell system of claim 4 wherein said threshold includes a fuel cell voltage fluctuation defined by at least one of a magnitude and a frequency of the individual fuel cell voltage fluctuations.

7. The fuel cell system of claim 1 further comprising a voltage sensor that monitors a stack voltage and provides a signal to said controller based on said parameter, which is said stack voltage.

8. The fuel cell system of claim 7 wherein said threshold includes a minimum stack voltage.

9. The fuel cell system of claim 7 wherein said threshold includes an average voltage fluctuation defined by at least one of a magnitude and a frequency of stack voltage fluctuations.

10. The fuel cell system of claim 1 further comprising a pressure sensing system that senses a pressure drop across said fuel cell stack and provides a signal to said controller based on said parameter which is said pressure drop.

11. The fuel cell system of claim 10 wherein said threshold value includes a maximum pressure drop.

12. The fuel cell system of claim 10 wherein said threshold includes an average pressure drop fluctuation defined by at least one of a magnitude and a frequency of stack pressure drop fluctuations.

13. The fuel cell system of claim 1 further comprising a temperature sensing system that senses a temperature change across said fuel cell stack and provides a signal to said controller based on said parameter which is said temperature change.

14. The fuel cell system of claim 13 wherein said threshold value includes a maximum temperature change.

15. The fuel cell system of claim 13 wherein said threshold includes an average temperature change fluctuation defined by at least one of a magnitude and a frequency of stack temperature change fluctuations.

16. The fuel cell system of claim 1 wherein said parameter is a resistance of at least one fuel cell.

17. The fuel cell system of claim 1 wherein said parameter is stack load and said threshold value is a minimum stack load.

18. The fuel cell system of claim 1 wherein said controller forms a part of said flow control device.

19. The fuel cell system of claim 1 wherein said reactant gas is hydrogen, oxygen, or air.

* * * * *